(12) United States Patent
He et al.

(10) Patent No.: US 12,490,257 B2
(45) Date of Patent: Dec. 2, 2025

(54) CONFIGURED GRANT BASED UPLINK TRANSMISSIONS IN WIRELESS COMMUNICATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Pengkai Zhao, Cupertino, CA (US); Wei Zeng, Saratoga, CA (US); Wei Zhang, Santa Clara, CA (US); Weidong Yang, San Diego, CA (US); Yuchul Kim, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 479 days.

(21) Appl. No.: 17/995,432

(22) PCT Filed: Apr. 8, 2020

(86) PCT No.: PCT/CN2020/083699
§ 371 (c)(1),
(2) Date: Oct. 4, 2022

(87) PCT Pub. No.: WO2021/203278
PCT Pub. Date: Oct. 14, 2021

(65) Prior Publication Data
US 2023/0345468 A1 Oct. 26, 2023

(51) Int. Cl.
*H04W 72/1268* (2023.01)
*H04L 1/1812* (2023.01)
*H04W 72/23* (2023.01)

(52) U.S. Cl.
CPC ....... *H04W 72/1268* (2013.01); *H04L 1/1812* (2013.01); *H04W 72/23* (2023.01)

(58) Field of Classification Search
CPC .. H04W 72/1268; H04W 72/23; H04L 1/1812
See application file for complete search history.

(56) References Cited

U.S. PATENT DOCUMENTS 11,962,423 B2 * 4/2024 Zhang .................. H04W 74/08
2018/0302191 A1 10/2018 Park et al.
(Continued)

FOREIGN PATENT DOCUMENTS

| CN | 108696943 | 10/2018 |
|----|-----------|---------|
| CN | 110535565 | 12/2019 |

(Continued)

OTHER PUBLICATIONS

Zte et al., "Remaining issues on configured grant for NR-U"; 3GPP TSG RAN WG1 Meeting #99, Nov. 18-22, 2019, R1-1911825, 8 sheets.
(Continued)

*Primary Examiner* — Fahmida S Chowdhury
(74) *Attorney, Agent, or Firm* — Fay Kaplun & Marcin, LLP

(57) ABSTRACT

The exemplary embodiments relate to determining that code block group (CBG) based transmissions are enabled, transmitting, via an unlicensed spectrum, configured grants comprising one or more CBG based transmissions and one or more transport block (TB) based transmissions and receiving a downlink feedback information (DFI) downlink control information (DCI) format, wherein the DFI DCI format comprises a hybrid automatic repeating request (HARQ) bitmap corresponding to the TB based transmissions and a HARQ bitmap corresponding to the CBG based transmissions. The exemplary embodiments may be implemented in
(Continued)

a computer readable storage medium, a user equipment (UE) or an integrated circuit.

19 Claims, 6 Drawing Sheets

(56) References Cited

U.S. PATENT DOCUMENTS

| | | | | |
|---|---|---|---|---|
| 2019/0222356 | A1* | 7/2019 | Zhang | H04L 1/0003 |
| 2019/0386783 | A1* | 12/2019 | Chou | H04L 1/1614 |
| 2020/0169357 | A1* | 5/2020 | Lei | H04L 1/0025 |
| 2020/0220663 | A1* | 7/2020 | Tsai | H04L 1/1822 |
| 2020/0221310 | A1* | 7/2020 | Babaei | H04L 5/0044 |
| 2020/0313807 | A1* | 10/2020 | Salem | H04L 1/1607 |
| 2021/0050947 | A1* | 2/2021 | Tsai | H04W 72/23 |
| 2021/0242980 | A1* | 8/2021 | Zhang | H04W 72/23 |
| 2021/0314102 | A1* | 10/2021 | Li | H04L 1/1614 |
| 2022/0209898 | A1* | 6/2022 | Karaki | H04W 72/23 |
| 2022/0294591 | A1* | 9/2022 | Liu | H04L 5/0053 |
| 2023/0224913 | A1* | 7/2023 | Huang | H04L 1/1864 |
| 2023/0345468 | A1* | 10/2023 | He | H04W 72/1268 |

FOREIGN PATENT DOCUMENTS

| | | |
|---|---|---|
| WO | 2016/163709 | 10/2016 |
| WO | 2019/217575 | 11/2019 |
| WO | 2020/032678 | 2/2020 |
| WO | 2020/033689 | 2/2020 |
| WO | 2020/034533 | 2/2020 |

OTHER PUBLICATIONS

Huawei et al., "Remaining issue on configured grant", 3GPP TSG-RAN WG2 Meeting #109, R2-2000959, Feb. 14, 2020, 4 sheets.

* cited by examiner

CONFIGURED GRANT BASED UPLINK TRANSMISSIONS IN WIRELESS COMMUNICATION

BACKGROUND

A user equipment (UE) may connect to a network that supports communication in the unlicensed spectrum. When connected, the UE may utilize a listen-before-talk (LBT) procedure for uplink channel access. LBT allows multiple devices to fairly share spectrum. However, multiple LBTs for a single uplink (UL) data transmission reduce the actual competitiveness to content for the channel. In some instances, a Configured Grant based (CG-based) transmission may be used where the resources for the transmission is semi-statically configured and the UE can start transmission immediately using the pre-configured resources without the need to send a scheduling request (SR) or waiting for a grant to avoid multiple LBTs.

SUMMARY

According to some exemplary embodiments a computer readable storage medium comprising a set of instructions that when executed by a processor of a user equipment cause the processor to perform operations. The operations include determining that code block group (CBG) based transmissions are enabled for the UE, transmitting, via an unlicensed spectrum, configured grants comprising one or more CBG based transmissions and one or more transport block (TB) based transmissions and
receiving a downlink feedback information (DFI) downlink control information (DCI) format, wherein the DFI DCI format comprises a hybrid automatic repeating request (HARQ) bitmap corresponding to the TB based transmissions and a HARQ bitmap corresponding to the CBG based transmissions.

Further exemplary embodiments include a user equipment (UE) having a transceiver and a baseband processor. The transceiver is configured to transmit, via an unlicensed spectrum, configured grants comprising one or more CBG based transmissions and one or more transport block (TB) based transmissions. The baseband processor is configured to generate a downlink feedback information (DFI) downlink control information (DCI) format, wherein the DFI DCI format comprises a hybrid automatic repeating request (HARQ) bitmap corresponding to the TB based transmissions and a HARQ bitmap corresponding to the CBG based transmissions.

Still further exemplary embodiments include a computer readable storage medium comprising a set of instructions that when executed by a processor of a user equipment configured to transmit transport blocks (TBs) via a configured grant in an unlicensed spectrum cause the processor to perform operations. The operations include determining a minimum processing time for a network component to process the TBs transmitted in the configured grant, receiving, from the network component, a DFI DCI format comprising a hybrid automatic repeating request (HARQ) bitmap for the configured grant and determining a HARQ operation based on the HARQ bitmap and the minimum processing time.

Further exemplary embodiments include a user equipment (UE) having a transceiver and a baseband processor. The transceiver is configured to receive a DFI DCI format comprising a hybrid automatic repeating request (HARQ) bitmap for a configured grant. The baseband processor is configured to determine a minimum processing time for a network component to process transport blocks (TBs) in the configured grant and determine a HARQ operation based on the HARQ bitmap and the minimum processing time.

DETAILED DESCRIPTION

Figure 1:
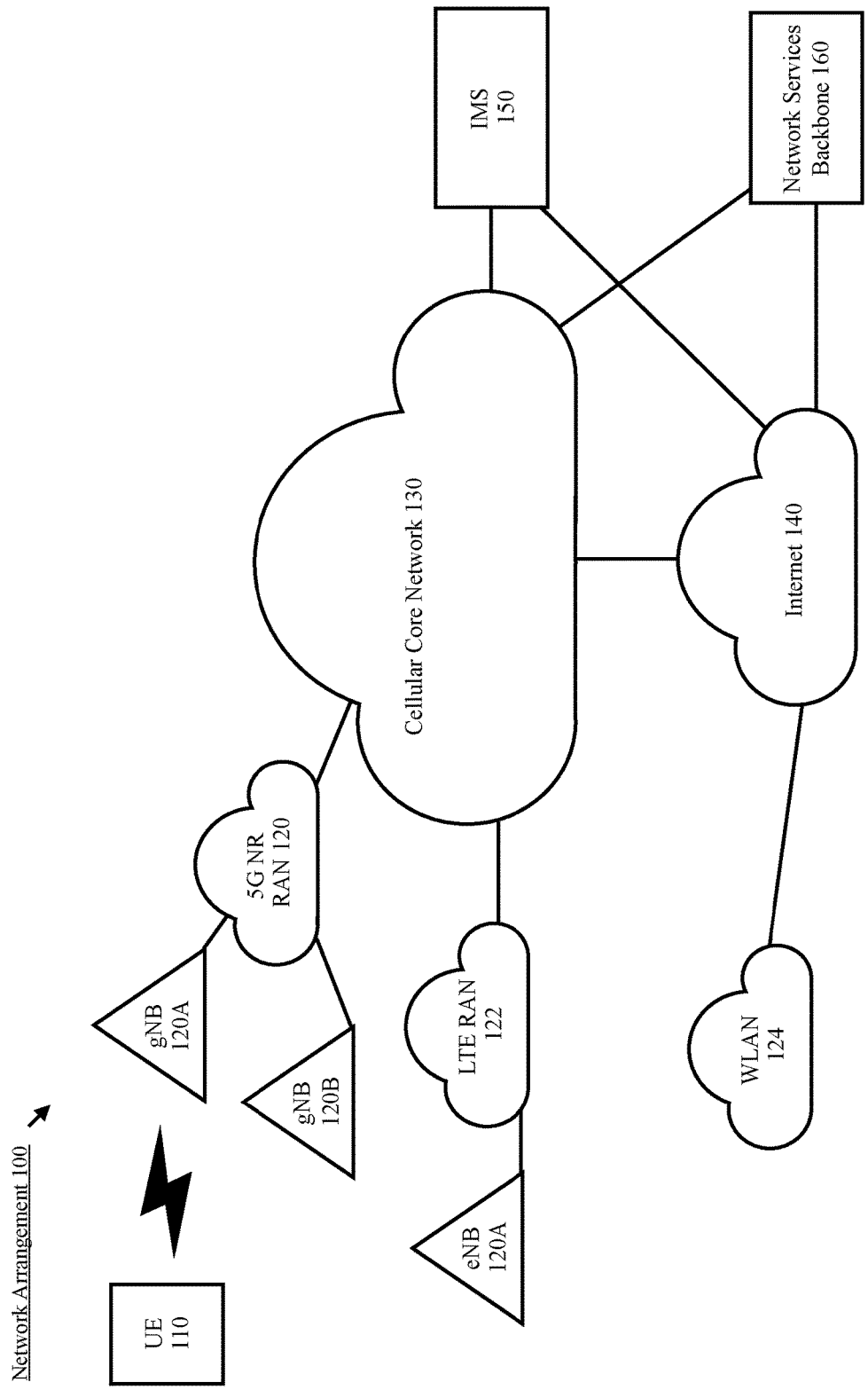
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to uplink (UL) communications in the unlicensed spectrum. In one aspect, the exemplary embodiments relate to a manner of performing hybrid automatic repeating request (HARQ) retransmissions when the user equipment (UE) is performing UL transmissions using configured grants. In another aspect, the exemplary embodiments relate to providing a downlink control information (DCI) format that carries downlink feedback information (DFI) for the HARQ processes. Each of these aspects of the exemplary embodiments will be described in greater detail below.

The exemplary embodiments are described with regard to the UE. However, reference to a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to the network being a fifth generation (5G) new radio (NR) network and the UL transmissions being Configured Grant-Physical Uplink Shared Channel (CG-PUSCH) occurring in the unlicensed band of 5G (NR-U). However, any reference to 5G NR, NR-U and CG-PUSCH is merely provided for illustrative purposes, the exemplary embodiments may apply to any appropriate network and utilize any appropriate transmissions.

As described above, in some instances, a UE may transmit a UL transmission using a configured grant. Those skilled in the art will understand that a configured grant relates to the concept of grant free scheduling. For example, a cell may reserve resources for uplink transmissions and the UE may be aware of these reserved resources. To perform an uplink transmission, the UE may utilize one of the reserved resources without sending a scheduling request and waiting for the subsequent grant message from the cell. These types of uplink transmissions may also be referred to as autonomous UL transmissions. Thus, throughout this description, a "configured grant" or "autonomous" UL transmission may refer to a transmission that is sent by the UE without the UE providing an explicit request for resources to perform the corresponding UL transmission.

However, in some instances the UL transmission will not be received correctly and the information in the UL transmission may need to be corrected. A manner of correcting the information in the UL transmission is using HARQ retransmissions. Those skilled in the art will understand that HARQ is a form of error correction that may include encoding the original transmission with a forward error correction (FEC) code and sending parity bits that are used for correction at a later time, e.g., the HARQ retransmissions, when a receiver detects a problem with the UL transmission. However, when the HARQ retransmissions are related to an original UL transmission that was sent using a configured grant, e.g., CG-PUSCH, there may be issues related to signaling overhead with such retransmissions. This overhead issue may we worse in the case when code block group (CBG) based transmissions are enabled for the CG-PUSCH.

In a first aspect, the exemplary embodiments will describe various mechanisms for HARQ retransmissions based on a HARQ-ACK bitmap in a downlink feedback information (DFI) format that includes two parts, a transport block (TB) based HARQ-ACK bitmap and a CBG-based HARQ-ACK bitmap. According to the first aspect exemplary embodiments of a DFI downlink control information (DCI) format is provided to communicate the HARQ-ACK bitmap.

In other exemplary embodiments, a DFI may also be used to indicate TB level HARQ-ACK bitmaps for all UL HARQ processes for autonomous UL transmissions. However, this should be accomplished without increasing blind decoding complexity at the UE. According to a second aspect, the exemplary embodiments relate to a DCI format used to indicate DFI to a UE that is activated with autonomous UL transmissions on a single serving cell or multiple serving cells. The exemplary DCI format may be size-aligned with one or more legacy DCI formats.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UE 110 may be within range of a plurality of gNBs. Thus, either simultaneously or alternatively, the UE 110 may also connect to the 5G NR-RAN 120 via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation/traffic of the cellular network and may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
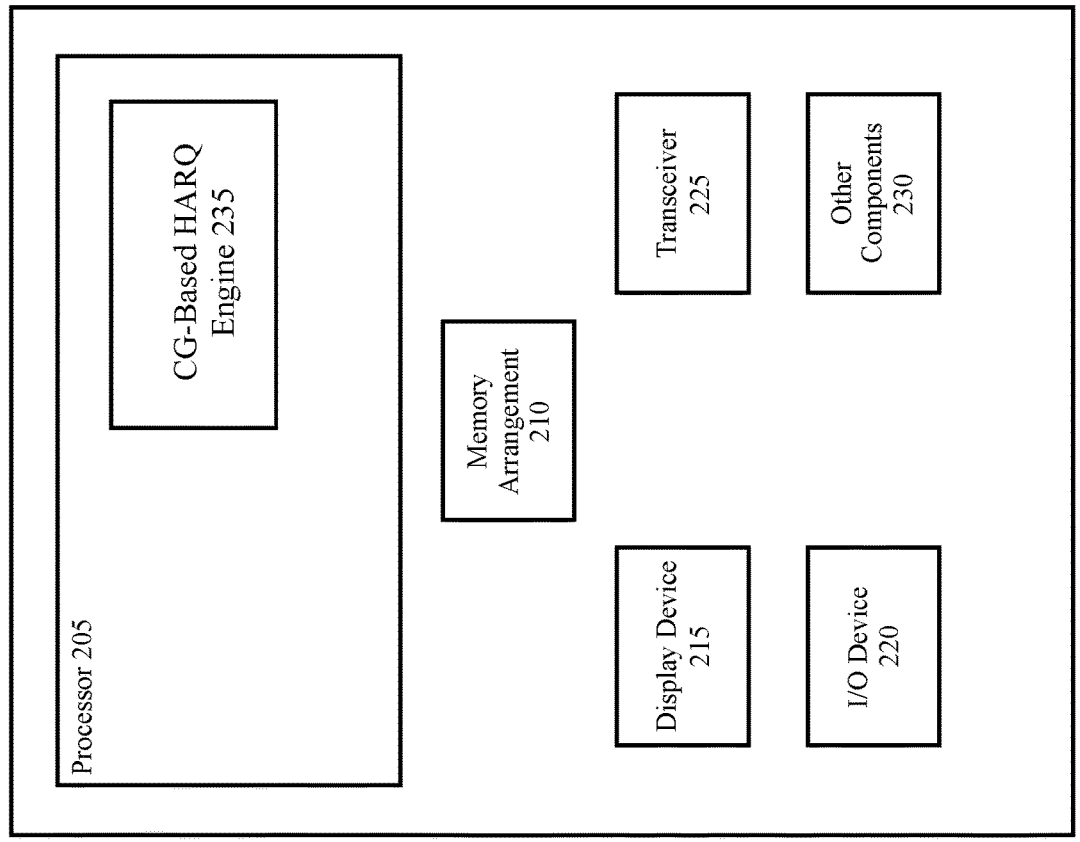
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 110 to other electronic devices, sensors to detect conditions of the UE 110, etc.

The processor 205 may be configured to execute one or more of engines for the UE 110. For example, the engines may include a CG-based HARQ engine 235. The CG-based HARQ engine 235 may be configured to operate for one or both aspects of the exemplary embodiments. For example, according to the first aspect, the CG-based HARQ engine 235 may configure the DFI format for the CBG-based and/or TB-based retransmissions. According to the second aspect, the CG-based HARQ engine 235 may use the DFI format that is received from the network for any type of CG-based transmissions.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, etc. Accordingly, the transceiver 225 may operate on a variety of different frequencies or channels (e.g., set of consecutive frequencies).

Figure 3:
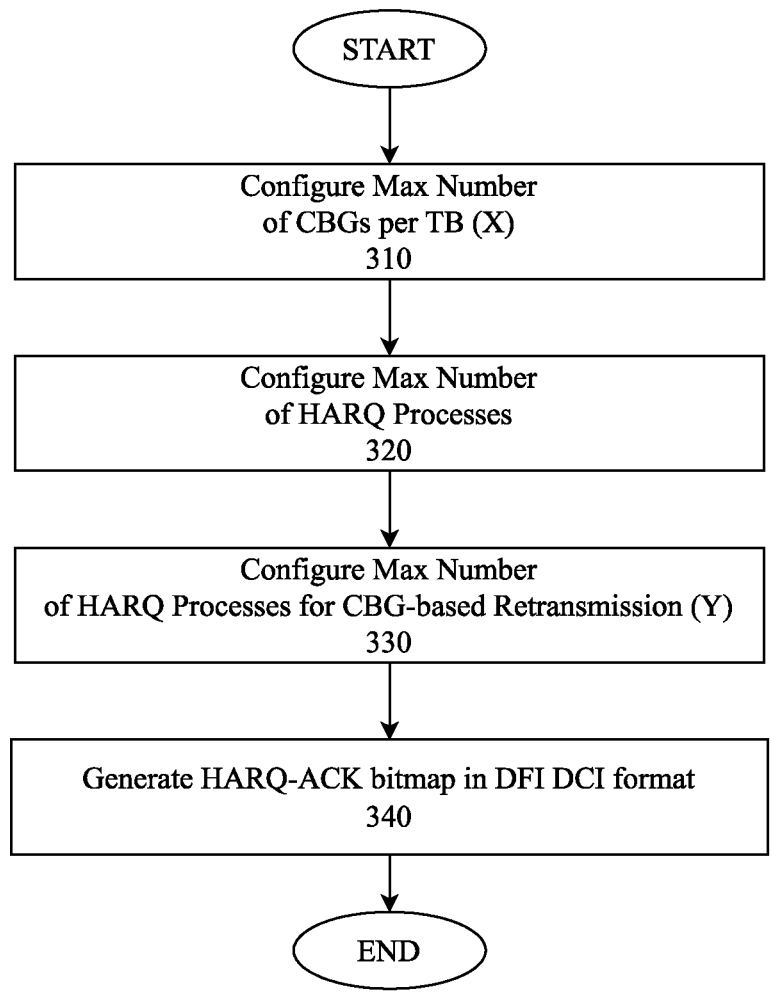
FIG. 3 shows an exemplary method for generating a HARQ-ACK bitmap in an exemplary downlink feedback information (DFI) downlink control information (DCI) format according to various exemplary embodiments.

FIG. 3 shows an exemplary method 300 for generating a HARQ-ACK bitmap in an exemplary DFI DCI format according to various exemplary embodiments. The method 300 will be described with reference to FIG. 4 that shows an exemplary DFI DCI format 400 to enable CBG-based HARQ retransmissions for CG-PUSCH by transmission of CBG-based HARQ-ACK feedback in DFI DCI format according to various exemplary embodiments. The number of bits and the bit values described as being included in the exemplary DFI DCI format 400 is specific to an example that will be described in greater detail below. Thus, one of ordinary skill in the art will understand that the DFI DCI format 400 is, as described, a format and the specific information (e.g., number of bits and bit values) that is included within the DFI DCI format 400 may change depending on the UL transmission for which it is being used. The manner of determining the number of bits that will be included in the DFI DCI format 400 will be described with reference to the exemplary method 300.

In addition, it will be described that the UE 110 is generating the DFI DCI format 400. Those skilled in the art will understand that the DFI DCI communication is a downlink (DL) communication that is transmitted from the network (e.g., gNB 120A) to the UE 110. However, the exemplary embodiments are describing exemplary manners of generating a format for those DFI DCI communications and, in some exemplary embodiments, the UE 110 may be responsible for generating this format because the UE 110 has information concerning the CG-based communications that the UE 110 will be transmitting in the uplink (UL).

In 310, a maximum number of CBGs per TB, denoted as X hereinafter, may be configured for each CG-PUSCH transmission. This maximum number of CBGs per TB may be configured by higher layers of the protocol stack of the UE 110 based on any number of factors including, for example, the capabilities of the UE 110 as well as the signaling overhead and the interference characteristic (e.g. burst or not) at the UE 110. In other examples, the UE 110 may receive this information from the network, e.g., 5G NR-RAN 120. Throughout this description it will be described that various operations are based on information provided by higher level layers within the UE 110. It should be understood that this information may be information that is generated by the UE 110 or information that is received from other entities, e.g., the network. In the example that is used to generate the DFI DCI format 400, it may be considered that X=4, e.g., the maximum number of CBGs per TB is 4.

In 320, a maximum number of HARQ processes may be configured. Again, this maximum number of HARQ processes may be configured by higher layers of the protocol stack of the UE 110. In the example that is used to generate the DFI DCI format 400, it may be considered that the maximum number of HARQ processes is 5.

In 330, a maximum number of HARQ processes that operate with the CBG-based retransmissions, denoted as Y hereinafter, may be configured. Again, this configuration may be performed by one or more of the higher level layers of the protocol stack of the UE 110. In the example that is used to generate the DFI DCI format 400, it may be considered that Y=2, e.g., the maximum number of HARQ processes that operate with the CBG-based retransmissions is 2.

Figure 4:
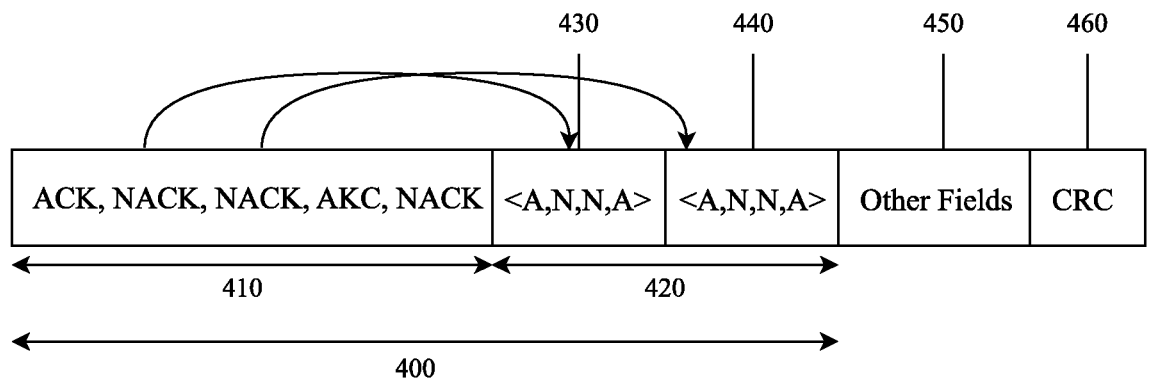
FIG. 4 shows an exemplary DFI DCI format to enable CBG-based retransmissions according to various exemplary embodiments.

In 340, the HARQ-ACK bitmap in the DFI DCI format is generated. As described above, the DFI DCI format 400 includes two parts. The first part is shown as a TB-based HARQ-ACK bitmap 410 in the DFI DCI format 400. The UE 110 may generate the TB-based HARQ-ACK bitmap 410 with a one-to-one mapping for all configured HARQ processes. In the example started above, the maximum number of HARQ processes was 5. Thus, the TB-based HARQ-ACK bitmap 410 shows a bitmap having 5 bits for 5 HARQ processes. In the example of FIG. 4, the bits are set as ACK, NACK, NACK, ACK, NACK. However, as described above the bit values are provided only as an example.

The second part of the DFI DCI format 400 is shown as CBG-based HARQ-ACK bitmap 420. The UE 110 may generate the CBG-based HARQ-ACK bitmap 420 based on Y*X HARQ-ACK information bits with a one-to-one mapping with the X CBGs for the first Y CG-PUSCHs that are associated with the "NACK" state in the corresponding TB-based HARQ-ACK bitmap 410.

Thus, in the example of the DFI DCI format 400 there are 2 bitmap portions 430 and 440 of the CBG-based HARQ-ACK bitmap 420. That is, because there are Y=2 maximum number of HARQ processes that operate with the CBG-based retransmissions in this example, the CBG-based HARQ-ACK bitmap 420 includes 2 bitmap portions 430 and 440. Each of the bitmap portions 430 and 440 include 4 bits because, in this example, there are X=4 maximum number of CBGs per TB. Each bitmap portion 430 and 440 includes a X-bit bitmap that is one-to-one mapping with the X CBGs for first Y CG-PUSCHs, e.g., as illustrated in FIG. 4, 4-bits bitmap of "A,N,N,A" (i.e. ACK, NACK, NACK, ACK) is generated based on the CBG-based PUSCH decoding result for each of bitmap portions 430 and 440. Finally, as shown by the arrows in FIG. 4, the bitmap portions 430 and 440 are associated with the first Y (in this example Y=2) "NACK" states in the corresponding TB-based HARQ-ACK bitmap 410.

To complete the description of FIG. 4, the DFI DCI format 400 may also include other fields 450 and a CRC field 460 for size alignment purposes. However, for the purposes of this description, it is not necessary to describe these fields in detail.

Thus, the exemplary method 300 of FIG. 3 may be used to generate the DFI DCI format 400. As described above, the specific number of bits and bit values may be dependent on the specific UL transmission. However, one of ordinary skill in the art will understand how to generate the DFI DCI format 400 including specific numbers of bits and bit values based on the above description.

Figure 5:
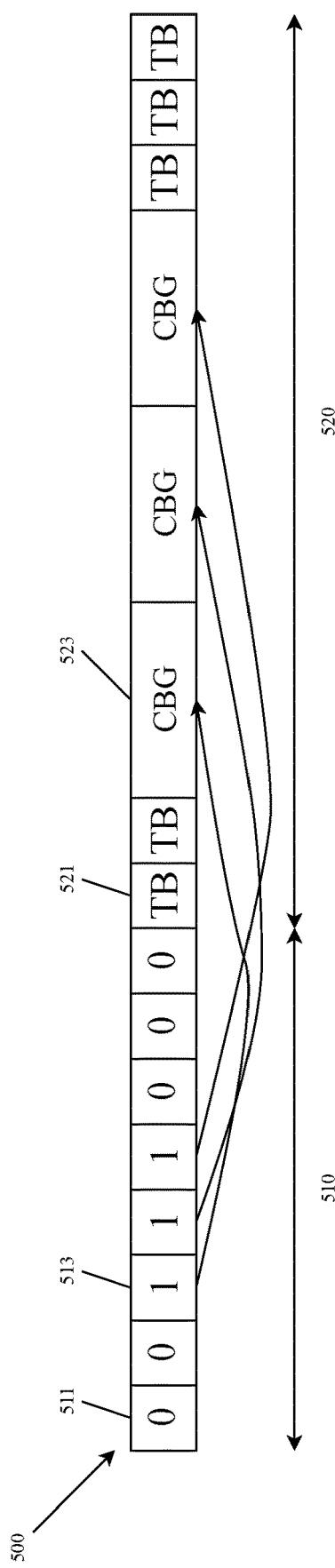
FIG. 5 shows a second exemplary DFI DCI format to enable CBG-based HARQ retransmissions according to various exemplary embodiments.

FIG. 5 shows a second exemplary DFI DCI format 500 to enable CBG-based HARQ retransmissions according to various exemplary embodiments. In this example, the DFI DCI format includes two fields, a set indicator field 510 and a TB-level and CBG-level HARQ-ACK bitmap field 520. It should be noted that the CBG-level HARQ-ACK bitmap field 520 may be populated in the same manner as described above with reference to method 300 of FIG. 3 and DFI DCI format 400 of FIG. 4. Thus, the number of bits and bit values for the various TB-level and CBG-level bitmaps are not shown in FIG. 5.

The set indicator field 510 has a bit width that is equal to either the number of configured HARQ processes for CG-PUSCH or for UL transmission including both CG-PUSCH and Dynamic-Granted PUSCH (DG-PUSCH). Thus, in this example, assuming the number of HARQ processes is 8, the set indicator field 510 is correspondingly 8 bits wide. Each of the bits of the set indicator field 510 is set to indicate whether the corresponding HARQ process will use a TB-level HARQ-ACK feedback or a CBG-level HARQ-ACK feedback. In this example, a bit value of "0" indicates a TB-level HARQ-ACK feedback and a bit value of "1" indicates a CBG-level HARQ-ACK feedback. For example, the first bit 511 of the set indicator field 510 is set to "0" indicating that the corresponding HARQ process 521 will use a TB-level HARQ-ACK feedback. On the other hand, a third bit 513 of the set indicator field 510 is set to "1" indicating that the corresponding HARQ process 523 will use a CBG-level HARQ-ACK feedback.

The number of HARQ processes using CBG-level HARQ-ACK feedback and the TB-level HARQ-ACK feedback may be configured by higher layers of the protocol stack of the UE 110. The higher layers may select the numbers by balancing, for example, signaling overhead and HARQ retransmission efficiency. However, a difference between the exemplary embodiment of FIG. 5 and the exemplary embodiment of FIG. 4 is that in this embodiment, the gNB determines which of the configured HARQ processes are selected to provide CBG-based HARQ-ACK information in the DFI format. The selected HARQ processes with CBG-based HARQ-ACK feedback are additionally signaled using field 510 in FIG. 5, which is not present in the example of FIG. 4

In some exemplary embodiments, the CG-PUSCH with CBG-based HARQ-ACK feedback may be indicated as part of the configured grant-uplink control information (CG-UCI) in the CG-PUSCH based on the interference status to assist the gNB (e.g., gNB 120A) in constructing the set indicator field 510.

Thus, the exemplary method 300 and the exemplary DFI DCI formats described with reference to FIGS. 4 and 5 provide manners of efficiently supporting HARQ retransmission for the CG-PUSCH, especially considering the case of having CBG-based transmissions enabled for the CG-PUSCH that conventionally include a large amount of DL control signaling overhead for CBG-based HARQ retransmissions.

As described above, a second aspect of the exemplary embodiments includes an exemplary DCI format that is used for indicating DFI to a UE that is activated with autonomous UL transmissions on a single serving cell or multiple serving cells. The exemplary DCI format allows the gNB to indicate the TB-level HARQ-ACK bitmap for all UL HARQ processes. The exemplary DCI format may be size-aligned with one of the legacy DCI formats, e.g., the size of the DCI format is similar or exactly same to previous DCI formats. By keeping the exemplary DCI format size-aligned with a legacy DCI, the blind decoding complexity for the DCI formats monitoring should not be increased.

Figure 6:
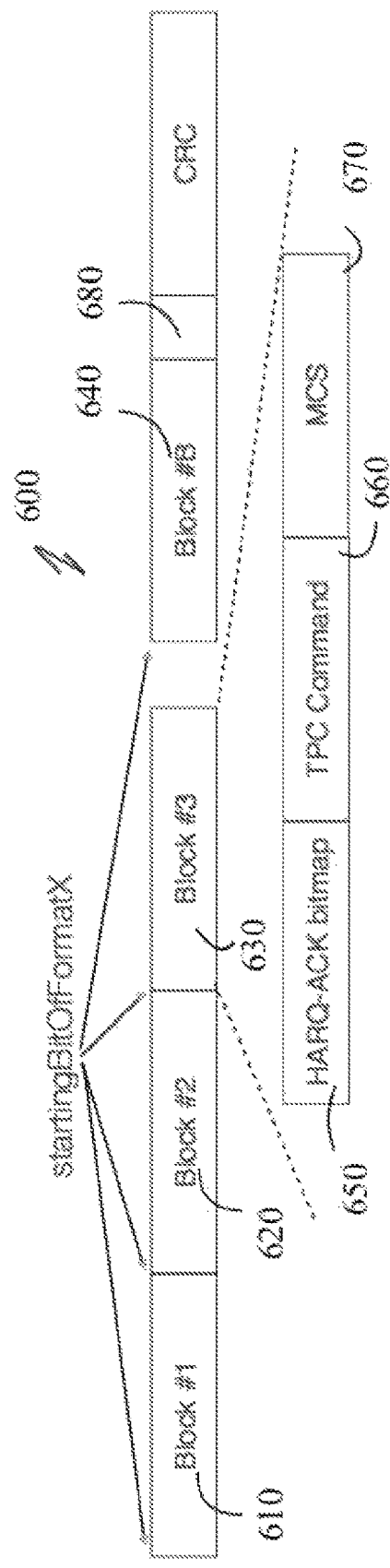
FIG. 6 shows a third exemplary DFI DCI format to indicate TB-level HARQ-ACK bitmaps for all UL HARQ processes according to various exemplary embodiments.

FIG. 6 shows a third exemplary DFI DCI format 600 to indicate TB-level HARQ-ACK bitmaps for all UL HARQ processes according to various exemplary embodiments. The DFI DCI format 600 includes a series of blocks, e.g., Block 1 610, Block 2 620, Block 3 630, Block B 640. The starting position of each block is indicated by a parameter that is provided by the higher level layers of the UE 110 that is configured with the particular block. In this example, the parameter is defined as startingBitOfFormatX. However, this is merely an exemplary name for the parameter. In cases where the UE 110 has more than one NR-U component carrier (CC), one or more blocks each corresponding to an NR-U cell may be configured for the UE 110.

Each block 610-640 includes a HARQ-ACK bitmap field 650, e.g., the TB-level HARQ-ACK bitmaps. In some exemplary embodiments, a size of the HARQ-ACK bitmap field 650 may be fixed to a predefined value. In one example, the fixed size is 16 bits since maximum number of UL HARQ processes per CC is 16 and each bit corresponds to one UL HARQ process. In other exemplary embodiments, the HARQ-ACK bitmap field 650 size equals the number of HARQ processes configured for CG-PUSCH transmission by higher layers.

Each block 610-640 also includes a Transmit Power Control (TPC) command 660 and a Modulation and Coding Scheme (MCS) 670. The MCS 670 may alternatively include a delta MCS or a Precoding Matric Indicator (PMI). The remaining bits 680 of each block 610-640 may be set to 0, for example, e.g. to size align with one or more of the existing DCI formats.

As described above, the DCI format 600 allows the gNB (e.g., gNB 120A) to indicate the TB-level HARQ-ACK bitmap for all UL HARQ processes. The UE 110 may receive the DCI format 600 and may be configured with information (e.g., the startingBitOfFormatX parameter) to understand the block (e.g., block 610-640) that corresponds to the CC being used by the UE 110. The UE 110 may use this information to decode the particular block and receive the TB-level HARQ-ACK bitmap that is relevant to the UE 110.

Figure 7:
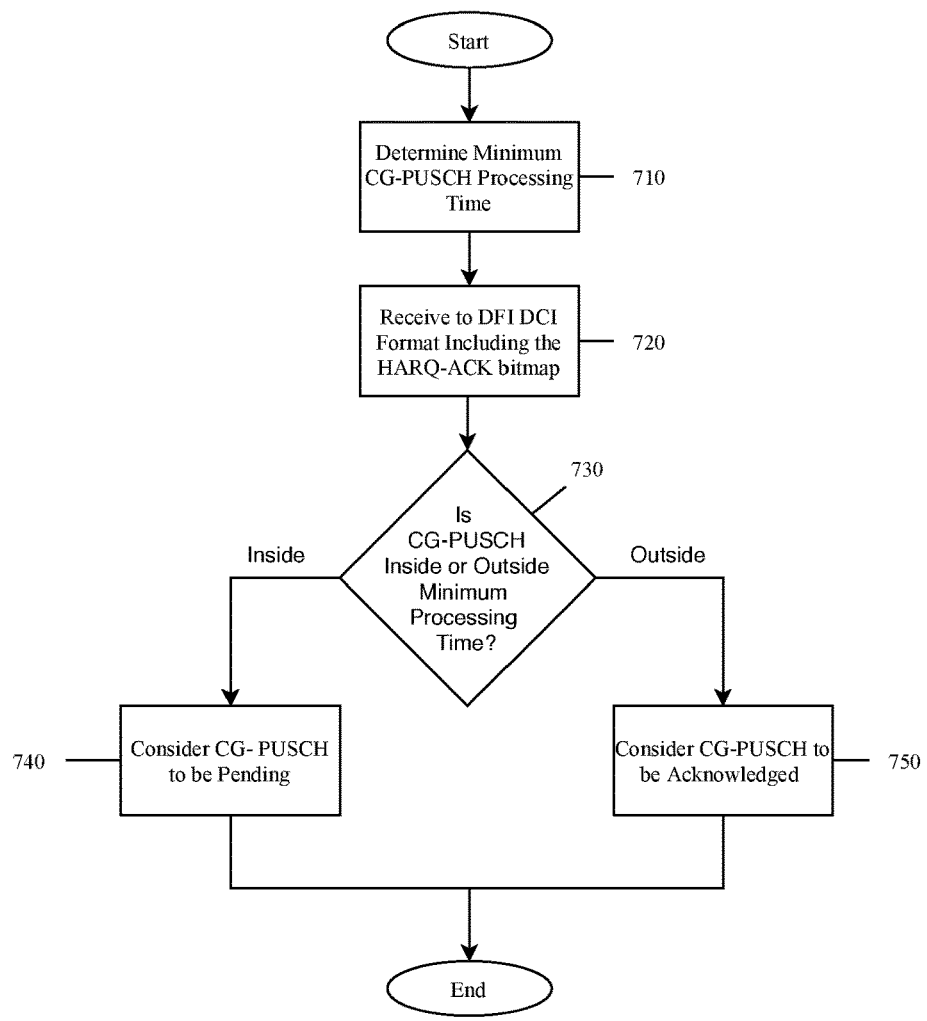
FIG. 7 shows an exemplary method of UE operation based on receiving the exemplary DFI DCI format of FIG. 6.

FIG. 7 shows an exemplary method 700 of UE operation based on receiving the exemplary DCI format 600. Thus, the method 700 will be described with reference to the DCI format 600. The operations of exemplary method 700 allow the UE 110 to properly interpret the HARQ-ACK bitmap field 650 in the received DFI DCI format 600. In addition, the exemplary method 700 will be described with reference to the exemplary CG-PUSCH timeline 800 of FIG. 8.

Figure 8:
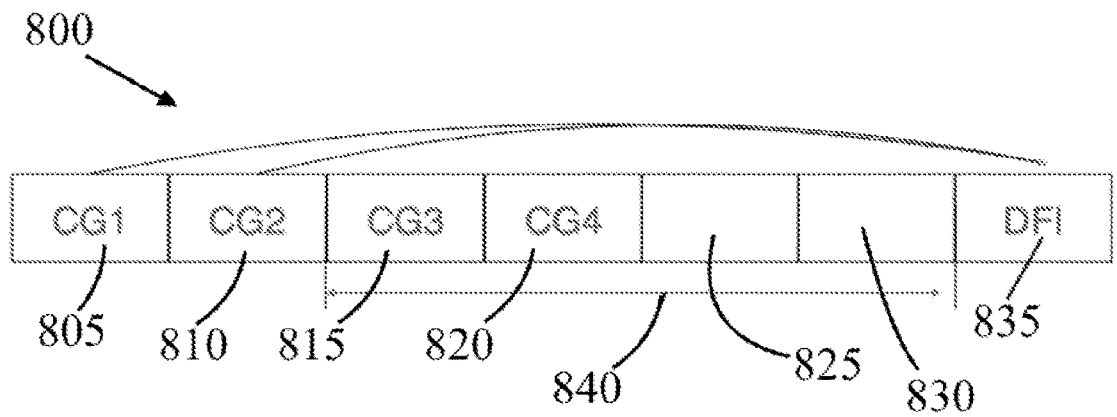
FIG. 8 shows an exemplary timeline of a CG-PUSCH transmission schedule according to various exemplary embodiments.

FIG. 8 shows an exemplary timeline 800 of a CG-PUSCH transmission schedule according to various exemplary embodiments. The timeline 800 will be used to illustrate the various operations of the method 700. In the example of FIG. 8, the timeline 800 shows 7 slots. The first 4 slots are CG-PUSCH transmissions CG1 805-CG4 820 by the UE 110. The next two slots 825-830 are blank that are allocated for CG-PUSCH transmission and the last slot 835 is the slot that the UE 110 received the DFI DCI format 600.

Referring back to FIG. 7, in 710, a minimum CG-PUSCH processing time is determined by the UE 110. The minimum CG-PUSCH processing time is the minimum amount of time that the network (e.g., gNB 120A) takes to process each UL transmission in the CG-PUSCH. There may be multiple manners for the UE 110 to determine the minimum CG-PUSCH processing time. In some exemplary embodiments, the minimum CG-PUSCH processing time may be configured by dedicated radio resource control (RRC) signaling as part of the CG-PUSCH configuration for Type-1 CG-PUSCH, or as part of the activation of the DCI format for Type-2 CG-PUSCH. In some other exemplary embodiments, the minimum CG-PUSCH processing time may be predefined in a specification (e.g., the 3GPP standards) for each subcarrier spacing configuration, e.g. 15 kHz, 30 kHz, etc. In still further exemplary embodiments, the minimum CG-PUSCH processing time may be broadcast in the system information block (SIB) for all UEs. Thus, the UE 110 will understand or obtain the minimum CG-PUSCH processing timeline and then properly interpret the HARQ-ACK information provided in the associated DFI format 835 based on the minimum CG-PUSCH process time 840. In the example of FIG. 8, it may be considered that the minimum CG-PUSCH processing time 840 is 4 slots.

In 720, the UE 110 receives the DFI DCI format 600 that includes the HARQ-ACK bitmap 650 including acknowledgements for one or more CG-PUSCH. As described above, the operations of method 700 allow the UE 110 to understand the HARQ-ACK bitmap 650. In the example of FIG. 8, the HARQ-ACK bitmap 650 may be considered to be the bitmap 850 (e.g., [CG1, CG2, CG3, CG4]=[A,A,N,N]. The operations described below will allow the UE 110 to understand this exemplary bitmap 850.

In 730, it is determined whether an individual CG-PUSCH transmission is within or outside the minimum CG-PUSCH processing time. Thus, each CG-PUSCH transmission may be characterized as belonging to either a first group that includes those CG-PUSCH transmissions that are outside the minimum CG-PUSCH processing time or a second group that includes those CG-PUSCH transmissions that are inside the minimum CG-PUSCH processing time.

Thus, for the example of FIG. 8, in 730 it may be determined that the CG1 805 and CG2 810 transmissions are outside the minimum CG-PUSCH processing time 840. In contrast, the CG3 815 and CG4 820 transmissions are inside the minimum CG-PUSCH processing time 840.

Referring back to FIG. 7, in 740, the UE 110 considers the CG-PUSCH transmissions that are inside the minimum CG-PUSCH processing time, e.g., the CG3 815 and CG4 820 transmissions in the example of FIG. 8. Because the transmissions CG3 815 and CG4 820 are within the minimum CG-PUSCH processing time, the UE 110 may consider that the transmissions CG3 815 and CG4 820 have not been processed yet by the gNB 120A because the transmissions CG3 815 and CG4 820 are inside the minimum CG-PUSCH processing time 840. Thus, the bits of the HARQ-ACK bitmap 850 corresponding to the transmissions CG3 815 and CG4 820 (e.g., the NACKs) may be considered by the UE 110 to indicate that the transmissions CG3 815 and CG4 820 are pending because the transmissions CG3 815 and CG4 820 have not yet been processed by the gNB 120A, e.g., the NACKs for these transmissions are not true NACKs.

In 750, the UE 110 considers the CG-PUSCH transmissions that are outside the minimum CG-PUSCH processing time, e.g., the CG1 805 and CG2 810 transmissions in the example of FIG. 8. Because the transmissions CG1 805 and CG2 810 are outside the minimum CG-PUSCH processing time, the UE 110 may consider that the transmissions CG1 805 and CG2 810 have been processed by the gNB 120A. In the example of FIG. 8, the corresponding bits of the bitmap 850 for the transmissions CG1 805 and CG2 810 are set to indicate as ACKs. Thus, the transmissions CG1 805 and CG2 810 may be considered to be acknowledged, e.g., the ACKs are true ACKs. Similarly, if the corresponding bits of the bitmap 850 for the transmissions CG1 805 and CG2 810 were set to indicate as NACKs, the UE 110 would consider these as true NACKs because the UE 110 would consider that the transmissions CG1 805 and CG2 810 had been processed by the gNB 120A.

Thus, at the completion of method 700, the UE 110 will understand the HARQ-ACK bitmap field 650 in the received DFI DCI format 600 for the corresponding CG-PUSCH transmissions.

The method 700 and the exemplary timeline 800 were used to describe an exemplary manner of the UE 110 interpreting the HARQ-ACK bitmap field 650 in the received DFI DCI format 600 for the CG-PUSCH transmissions. It may also be considered that the HARQ-ACK bitmap field 650 in the received DFI DCI format 600 may be used to determine when to apply CG-PUSCH retransmissions. An example of this process will be described with reference to FIG. 9.

Figure 9:
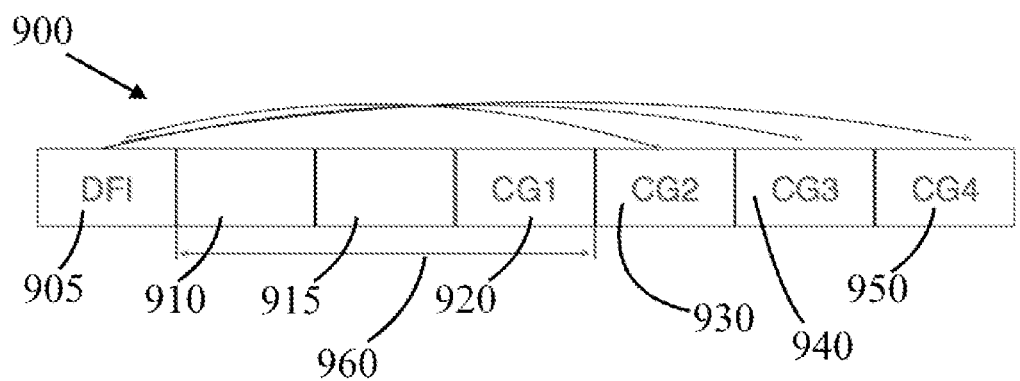
FIG. 9 shows an exemplary timeline of a CG-PUSCH retransmission schedule according to various exemplary embodiments.

FIG. 9 shows an exemplary timeline 900 of a CG-PUSCH retransmission schedule according to various exemplary embodiments. In the example of FIG. 9, the timeline 900 shows 7 slots. The first slot 905 is the slot that the UE 110 received the DFI DCI format 600. The next two slots 910-915 are blank, e.g., these slots are not configured for CG-PUSCH transmission. The next four slots are CG-PUSCH retransmissions CG1 920-CG4 950.

Similar to the method of FIG. 7, the UE 110 will determine a minimum processing time, referred to as K. As those skilled in the art will understand, the minimum processing time K refers to processing time of the UE 110 to process the DFI DCI format 600 received in slot 905. This minimum processing time may be determined in multiple manners. In some exemplary embodiments, the minimum processing time may be considered the time from UL grant to PUSCH transmission as defined in the 3GPP Release 15 standard, e.g., the K2 value defined in that standard. In other exemplary embodiments, the minimum processing time may be reported as part of the UE 110 capabilities for each subcarrier spacing.

In the example of FIG. 9, it may be considered that minimum processing time 960 (K) is three slots. Thus, the UE 110 may retransmit the HARQ processes or apply any updated transmission parameters starting from the HARQ retransmission slot 930 corresponding to the retransmission CG2 930 and the subsequent retransmissions CG3 940 and CG4 950. In contrast, because the retransmission slot for CG1 920 is within the minimum processing time 960, this is not possible for this slot.

Figure 10:
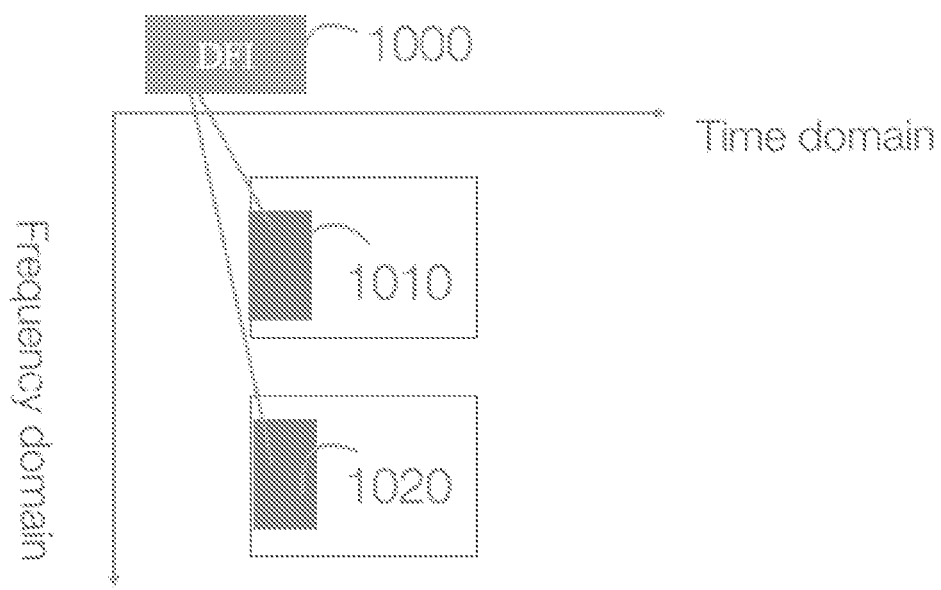
FIG. 10 shows an exemplary search space 1000 for the DFI DCI format 600 according to various exemplary embodiments.

FIG. 10 shows an exemplary search space for the DFI DCI format 1000 according to various exemplary embodiments. Those skilled in the art will understand that the UE 110 may not be aware of the exact location in time and frequency where the UE 110 will receive the DFI DCI format 1000. Rather, the UE 110 may be provided with a search space (e.g., range of times/frequencies) where the UE 110 may monitor for the DFI DCI format 1000.

In the exemplary embodiments, the UE 110 may be provided with multiple search space sets to monitor for the DFI DCI format 1000. These multiple search space sets may each be on a different serving cell or different RB set (i.e. LBT sub-band) within a serving cell to provide a robustness for the DFI transmission accounting for the LBT operation requested for CCs on unlicensed band. For example, referring to FIG. 10, the UE 110 may be configured to search for the same DFI DCI format 1000 on the downlink component carrier 0 (DL CC0) (e.g., DFI DCI format 1010) and on downlink component carrier 1 (DL CC1) (e.g., DFI DCI format 1020). In some exemplary embodiments, when the DFI DCI format 1000 is detected on the component carrier having the lower index (e.g., CC0 in FIG. 10), the UE 110 may skip decoding DFI candidates on the component carriers having the larger serving cell index (e.g., CC1 in FIG. 10).

As described above, one of the design aspects of the exemplary DFI DCI format is that it is size-aligned with legacy DFI formats. Thus, the UE 110 may not be able to distinguish the exemplary DFI DCI format based on size alone. In some exemplary embodiments, the CRC of the exemplary DFI DCI format may be scrambled with a dedicated Radio Network Temporary Identifier (RNTI). In other exemplary embodiments, a flag field (e.g., 1 or 2 bits) may be added to DFI DCI formats to distinguish between the different types of DFI DCI formats.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A non-transitory computer readable storage medium comprising a set of instructions, wherein the set of instructions when executed by a processor of a user equipment (UE) cause the processor to perform operations comprising:
    determining that code block group (CBG) based transmissions are enabled for the UE;
    transmitting, via an unlicensed spectrum, configured grants comprising one or more CBG based transmissions and one or more transport block (TB) based transmissions; and
    generating a downlink feedback information (DFI) downlink control information (DCI) format, wherein the DFI DCI format comprises a hybrid automatic repeating request (HARQ) bitmap corresponding to the TB based transmissions and a HARQ bitmap corresponding to the CBG based transmissions,
    wherein the generating the DFI DCI format comprises:
        configuring a maximum number of CBG based transmissions per TB;
        configuring a maximum number of HARQ processes for each TB based retransmission; and
        configuring a maximum number of HARQ processes for each CBG based transmission,
    wherein the HARQ bitmap corresponding to the CBG based transmissions comprises a number of portions corresponding to the maximum number of HARQ processes for each CBG based transmission
    wherein each of the portions of the HARQ bitmap corresponding to the CBG based transmissions comprises a number of bits corresponding to the maximum number of CBGs per TB and each bit corresponds to one CBG in a CBG based transmission.

2. The non-transitory computer readable storage medium of claim 1, wherein the HARQ bitmap corresponding to the TB based transmissions comprises a bit corresponding to each of the maximum number of HARQ processes for each TB based retransmission or for each uplink transmission including both TB based and CBG based transmissions.

3. The non-transitory computer readable storage medium of claim 1, wherein each of the portions of the HARQ bitmap corresponding to the CBG based transmissions corresponds to a number in sequential order of negative acknowledgements (NACKs) in the HARQ bitmap corresponding to the TB based transmissions that equals to the maximum number of HARQ processes for each CBG based transmission.

4. The non-transitory computer readable storage medium of claim 1, wherein the DFI DCI format further includes a set indicator field, wherein the set indicator field includes a number of bits corresponding to a number of HARQ processes for the configured grant, wherein each bit of the set indicator field corresponds to one of a TB based HARQ or a CBG based HARQ.

5. The non-transitory computer readable storage medium of claim 1, the operations further comprising:
receiving multiple search space sets for DCI.

6. The non-transitory computer readable storage medium of claim 5, wherein the UE is configured to search for a same DCI on a first component carrier and a second component carrier.

7. A user equipment (UE), comprising:
a transceiver configured to transmit, via an unlicensed spectrum, configured grants comprising one or more CBG based transmissions and one or more transport block (TB) based transmissions; and
a baseband processor configured to generate a downlink feedback information (DFI) downlink control information (DCI) format, wherein the DFI DCI format comprises a hybrid automatic repeating request (HARQ) bitmap corresponding to the TB based transmissions and a HARQ bitmap corresponding to the CBG based transmissions,
wherein the generating the DFI DCI format comprises:
configuring a maximum number of CBG based transmissions per TB;
configuring a maximum number of HARQ processes for each TB based retransmission; and
configuring a maximum number of HARQ processes for each CBG based transmission,
wherein the HARQ bitmap corresponding to the CBG based transmissions comprises a number of portions corresponding to the maximum number of HARQ processes for each CBG based transmission
wherein each of the portions of the HARQ bitmap corresponding to the CBG based transmissions comprises a number of bits corresponding to the maximum number of CBGs per TB and each bit corresponds to one CBG in a CBG based transmission.

8. The UE of claim 7, wherein the CBG based transmissions are transmitted on a Physical Uplink Shared Channel (PUSCH).

9. The UE of claim 7, wherein the HARQ bitmap corresponding to the TB based transmissions comprises a bit corresponding to each of the maximum number of HARQ processes for each TB based retransmission or for each uplink transmission including both TB based and CBG based transmissions.

10. The UE of claim 7, wherein the HARQ bitmap corresponding to the CBG based transmissions comprises a number of portions corresponding to the maximum number of HARQ processes for each CBG based transmission.

11. The UE of claim 7, wherein the DFI DCI format further includes a set indicator field, wherein the set indicator field includes a number of bits corresponding to a number of HARQ processes for the configured grant, wherein each bit of the set indicator field corresponds to one of a TB based HARQ or a CBG based HARQ.

12. The UE of claim 7, further comprising:
receiving multiple search space sets for DCI.

13. The UE of claim 12, wherein the UE is configured to search for a same DCI on a first component carrier and a second component carrier.

14. A processor of a user equipment (UE) configured to:
determine that code block group (CBG) based transmissions are enabled for the UE;
transmit, via an unlicensed spectrum, configured grants comprising one or more CBG based transmissions and one or more transport block (TB) based transmissions; and
generate a downlink feedback information (DFI) downlink control information (DCI) format, wherein the DFI DCI format comprises a hybrid automatic repeating request (HARQ) bitmap corresponding to the TB based transmissions and a HARQ bitmap corresponding to the CBG based transmissions
wherein the generating the DFI DCI format comprises:
configuring a maximum number of CBG based transmissions per TB;
configuring a maximum number of HARQ processes for each TB based retransmission; and
configuring a maximum number of HARQ processes for each CBG based transmission,
wherein the HARQ bitmap corresponding to the CBG based transmissions comprises a number of portions corresponding to the maximum number of HARQ processes for each CBG based transmission
wherein each of the portions of the HARQ bitmap corresponding to the CBG based transmissions comprises a number of bits corresponding to the maximum number of CBGs per TB and each bit corresponds to one CBG in a CBG based transmission.

15. The processor of claim 14, wherein the HARQ bitmap corresponding to the TB based transmissions comprises a bit corresponding to each of the maximum number of HARQ processes for each TB based retransmission or for each uplink transmission including both TB based and CBG based transmissions.

16. The processor of claim 14, wherein each of the portions of the HARQ bitmap corresponding to the CBG based transmissions corresponds to a number in sequential order of negative acknowledgements (NACKs) in HARQ bitmap corresponding to the TB based transmissions bitmap that equals to the maximum number of HARQ processes for each CBG based transmission.

17. The processor of claim 14, wherein the DFI DCI format further includes a set indicator field, wherein the set indicator field includes a number of bits corresponding to a number of HARQ processes for the configured grant, wherein each bit of the set indicator field corresponds to one of a TB based HARQ or a CBG based HARQ.

18. The processor of claim 14, further configured to:
receive multiple search space sets for DCI.

19. The UE of claim 18, wherein the UE is configured to search for a same DCI on a first component carrier and a second component carrier.

* * * * *